(12) United States Patent
Garrett et al.

(10) Patent No.: US 7,143,276 B2
(45) Date of Patent: Nov. 28, 2006

(54) ENTRYPOINT DISCOVERY TECHNIQUES IN A BIOS ENTITY

(75) Inventors: Michael R. Garrett, Cypress, TX (US); John S. Lacombe, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

(21) Appl. No.: 10/034,220

(22) Filed: Dec. 28, 2001

(65) Prior Publication Data

US 2003/0131223 A1    Jul. 10, 2003

(51) Int. Cl.
*G06F 15/177* (2006.01)
*G06F 13/00* (2006.01)
*G06F 9/44* (2006.01)

(52) U.S. Cl. .................. 713/2; 719/321; 719/327; 717/170

(58) Field of Classification Search ........ 717/168–178, 717/120–122; 719/321, 327; 713/1, 2, 100; 710/1, 3, 8–10, 36, 48, 268
See application file for complete search history.

(56) References Cited

U.S. PATENT DOCUMENTS

| | | | | |
|---|---|---|---|---|
| 5,586,324 A | * | 12/1996 | Sato et al. ............... | 713/2 |
| 5,887,169 A | * | 3/1999 | Lacombe .................. | 719/311 |
| 5,892,906 A | * | 4/1999 | Chou et al. .............. | 713/202 |
| 5,964,875 A | * | 10/1999 | Autor et al. ............. | 713/100 |
| 6,425,079 B1 | * | 7/2002 | Mahmoud .................. | 713/2 |
| 6,578,069 B1 | * | 6/2003 | Hopmann et al. .......... | 709/203 |
| 6,718,464 B1 | * | 4/2004 | Cromer et al. ............ | 713/2 |
| 6,728,830 B1 | * | 4/2004 | Assaf .................... | 711/112 |
| 2002/0099934 A1 | * | 7/2002 | Cromer et al. ............ | 713/2 |
| 2003/0097555 A1 | * | 5/2003 | Cheston et al. ........... | 713/2 |
| 2003/0140291 A1 | * | 7/2003 | Brown et al. ............. | 714/724 |
| 2005/0160191 A1 | * | 7/2005 | Maciesowicz ............. | 710/1 |

* cited by examiner

*Primary Examiner*—Antony Nguyen-Ba

(57) ABSTRACT

The specification discloses a structure and related method for determining whether a particular BIOS routine is supported on a computer system, and if so, the service number for that BIOS routine. This determination is made by a software program accessing a table which correlates unique identification numbers for each BIOS routine with a BIOS call service number. The presence or absence of a unique identification number in the table is an indication to the calling program whether the BIOS implements the desired BIOS routine. If the unique identification number exists in the table, it thus identifies the service number for the particular BIOS routine.

30 Claims, 1 Drawing Sheet

ENTRYPOINT DISCOVERY TECHNIQUES IN A BIOS ENTITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention relate to operation of computer systems. More particularly, the preferred embodiments are directed to calling basic input/output system (BIOS) routines in a computer system. More particularly still, the preferred embodiments are directed to determining the availability and the specific interrupt service number of BIOS routines in a computer system.

2. Background of the Invention

The heart of any computer system is the motherboard. The motherboard generally contains a microprocessor, main memory array, and various bridge devices which enable hardware and software components to communicate and perform their respective functions. Given the fact that there are many motherboard manufacturers, which may include any of an array of possible microprocessors, there is likewise an array of varying steps and procedures required for software to communicate with hardware. However, software applications, for example word processors and Internet browsers, are typically written for a class of computers without distinction as to a specific brand of computer system or the specific type of motherboard. Thus, some functions which software applications perform are abstracted (or taken away from the) software applications such that the specifics for each hardware implementation need not be embodied in the user-level software. The first level of abstraction between user-level programs and hardware typically takes the form of driver programs. Thus, rather than user-level software attempting to communicate directly with hardware, this software need only be programmed to communicate with a respective driver program. The driver program then is assigned the task of communicating with the hardware devices. Performing the task of communicating with hardware may take the form of calling basic input/output system (BIOS) routines to perform very specific tasks. While many BIOS routines are standard across all types of computing systems, most ROM BIOS manufacturers allow original equipment manufacturers (OEMs), companies who make the computers that consumers purchase, to define their own BIOS routines. The problem, however is keeping track of the many BIOS routines that an OEM may provide.

It has become customary in the art for one person within an OEM to take responsibility for keeping track of the BIOS routines added. That is, if a software developer needs to create a new BIOS routine, the developer contacts the person responsible for managing the added BIOS routines, the BIOS call owner, to request the next available services number. This services number is assigned to the exclusion of all others thereafter. In large corporations, merely finding the person who is responsible for managing the assignment of services numbers for new BIOS routines may be difficult. Moreover, once a BIOS routine has been created under a particular services number, it is very difficult to change or update the services number because of support for legacy driver software that may know the BIOS routine by interrupt category and services number only. Thus, it is possible that multiple assigned interrupt services numbers (a limited resource) may be allocated to multiple BIOS routines whose functions are only minimally different.

Outside the context of development and more in the context of operating software, it is difficult for device drivers, software typically responsible for executing BIOS routines, to determine whether a particular OEM-added BIOS routine is supported on a computer system. A first way to determine if a particular BIOS routine is supported is to simply call the BIOS routine and check the return status. Generally speaking, a return value of 86 h (86 hexadecimal) from a called BIOS routine is an indication that the BIOS routine is not supported. Calling the BIOS routine in an effort to determine whether that routine is available is dangerous in some cases in that the call to the unsupported BIOS routine may cause a computer system crash.

A second method for determining whether a particular BIOS routine is supported is to have the kernel level software (driver) which does the BIOS call first check a BIOS information table to obtain a BIOS version number, as well as the BIOS date, and compare the information to determine whether the BIOS supports the BIOS routine desired. This, however, cannot guarantee that in every circumstance a correct conclusion regarding support for a particular BIOS routine, and further may require a substantial amount of information to be hard coded in each driver for the comparison step, which significantly increases the footprint of the driver in main memory.

Thus, what is needed in the art is a mechanism to uniquely identify BIOS routines, as well as a mechanism to determine whether any particular BIOS routine is supported in a computer system, without the possibility of crashing the system in the determination process or requiring driver programs to keep large tables of information for compatibility checking purposes.

BRIEF SUMMARY OF THE SOME OF THE PREFERRED EMBODIMENTS

The problems noted above are solved in large part by a method of operating a computer system in which basic input/output system (BIOS) routines supplied by an original equipment manufacturer (OEM) are each preferably assigned a unique identification number. Kernel level software, for example drivers, preferably access a data table, stored in the read-only memory (ROM), to determine a service number associated with a particular BIOS routine (which the driver identifies by the unique identification number for the BIOS routine). Thus, by checking the data table, the driver determines not only whether the particular BIOS supports the desired routine, but also the routine's service number.

More specifically, preferably each BIOS routine supplied by an OEM is assigned a Globally Unique Identifier (GUID). GUIDs are preferably created with an algorithm that uses the network address and current time of the machine executing the program, and creates a 128 bit number that is, for all practical purposes, globally unique across time and space. Each BIOS routine is then associated with a GUID, and preferably only the supported GUIDs are present in the table in the ROM. The calling driver program checks the table, using the GUID of the desired BIOS routine, to ascertain whether the BIOS routine is supported.

If the BIOS routine is supported, the data table also reveals the service number associated with the BIOS routine. Once this information is ascertained by the driver program, the driver initiates the interrupt, including the service number, to start the desired BIOS routine.

The disclosed methods and structures comprise a combination of features and advantages which enable it to overcome the deficiencies of the related art devices and systems. The various characteristics described above, as well as other features, will be readily apparent to those skilled in the art upon reading the following detailed description and by referring to the accompanying drawings.

BRIEF DESCRIPTION OF THE DRAWINGS

For a detailed description of the preferred embodiments of the invention, reference will now be made to the accompanying drawings in which.

Notation and Nomenclature

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

In most computing systems prior to the Intel™ Itanium™ system (that is, 32 bit or less microprocessors), BIOS routines are generally referred to by an interrupt number, for example interrupt 15 h (15 hexadecimal), and a service number, for example service 3. In Itanium™ based computer systems, access to BIOS routines is made through a system abstraction layer (SAL) by means of a C programming language style function call, with the service number identifying the specific routine. Throughout this specification and in the claims, the term BIOS routine means the software program which is identified in the BIOS by a combination of an interrupt and services number, for systems prior to the Itanium™ microprocessors, and strictly by a service number for the Itanium™ based systems (although the preferred embodiments also identify a BIOS routine with a unique identification number). The interrupt number for pre-Itanium™ implementations may also be referred to as an interrupt category. Moreover, the service number may alternatively be referred to as a BIOS call service number or a BIOS routine service number.

DETAILED DESCRIPTION OF THE PREFERRED EMBODIMENTS

Figure 1:
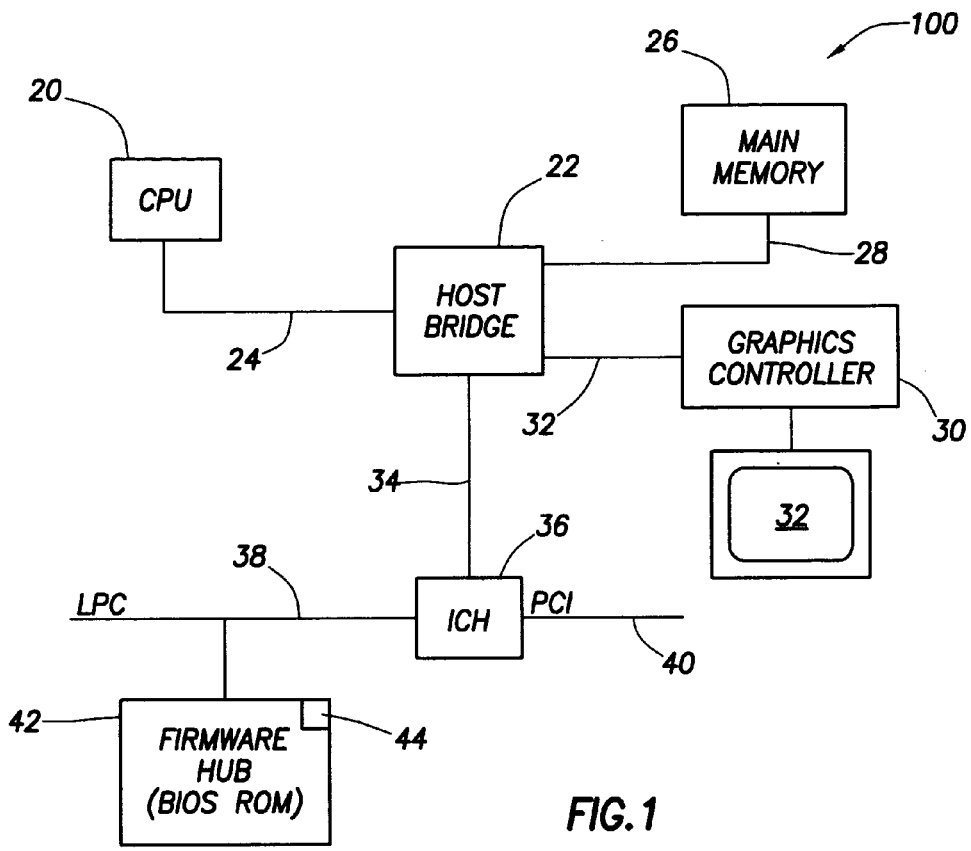
FIG. 1 shows a computer system constructed in accordance with the preferred embodiments.

FIG. 1 shows a computer system 100 constructed in accordance with the preferred embodiment. Computer system 100 generally comprises a microprocessor or CPU 20 coupled to a main memory array 26 and various other peripheral computer system components through an integrated host bridge 22. The CPU 20 preferably couples to the host bridge logic 22 by way of a host bus 24, or the host bridge logic 22 may be integrated into the CPU 20. The CPU 20 preferably comprises an Itanium™ microprocessor made by Intel Corporation. It should be understood, however, that computer system 100 could comprise other microprocessors as well, for example Pentium III™ or Pentium IV™ microprocessors made by Intel Corporation, or microprocessors made by other manufacturers such as Advanced Micro Devices. Thus, the computer system may implement other bus configurations or bus bridges in addition to, or in place of, those shown in FIG. 1. Moreover, computer system 100 could also comprise several microprocessors, and this too would be within the contemplation of this invention Main memory 26 preferably couples to the host bridge 22 through a memory bus 28. The host bridge 22 preferably includes a memory control unit (not shown) that controls transactions to the main memory 26 by asserting the necessary control signals during memory accesses. The main memory 26 functions as the working memory for the CPU 20 and comprises a conventional memory device or array of memory devices in which programs, instructions and data are stored. The main memory 26 may comprise any suitable type of memory such as dynamic random access memory (DRAM) or any of the various types of DRAM devices such as synchronous DRAM (SDRAM), extended data output DRAM (EDO DRAM), or Rambus™ DRAM (RDRAM).

The computer system 100 also comprises a graphics controller or video driver card 30 that couples to the host bridge 22 via an Advanced Graphics Port (AGP) bus 32, or other suitable type of bus. Alternatively, the video driver card may couple to the primary expansion bus 34 or one of the secondary expansion buses, for example, PCI bus 40. Graphics controller 30 further couples to a display device 32 which may comprise any suitable electronic display device upon which any image or text can be represented.

The computer system 100 also comprises a second bridge logic device 36 that bridges the primary expansion bus 34 to various secondary buses including a low pin count (LPC) bus 38 and a peripheral component interconnect (PCI) bus 40. In accordance with the preferred embodiment, the bridge device 36 comprises an Input/Output Controller Hub (ICH) manufactured by Intel Corporation. Although the ICH 36 is shown in FIG. 1 only to support the LPC bus 38 and PCI bus 40, various other secondary buses may be supported by the ICH 36.

In the embodiment shown in FIG. 1, the primary expansion bus 34 comprises a Hub-link bus which is a proprietary bus of Intel Corporation. However, computer system 100 is not limited to any particular type of chipset and thus the primary expansion bus may comprise any other suitable buses.

Referring still to FIG. 1, a firmware hub 42 couples to the ICH 36 by way of the LPC bus 38. The firmware hub 46 preferably comprises read only memory (ROM) which contains software programs executable by the CPU 20. The software programs comprises programs to implement basic input/output system (BIOS) commands and instructions executed during and just after power on self test (POST)

procedures. The software programs perform various functions including verifying proper operation of various system components before control of the system is turned over to the operating system.

The preferred embodiments of the present invention are implemented in an Itanium™ based computer system. Itanium™ based systems have migrated away from traditional software interrupts to invoke BIOS routines, and instead use C programming language style calls, with a particular BIOS routine identified by a passed parameter. In particular, consider the following exemplary calling convention as specified by Intel Corporation:

```
typedef struct tagRetParam
{
    INT64           p0;
    INT64           p1;
    INT64           p2;
    INT64           p3;
} rArg;
rArg SAL_PROC (
    WIDTH64BIT      Arg0,
    WIDTH64BIT      Arg1,
    WIDTH64BIT      Arg2,
    WIDTH64BIT      Arg3,
    WIDTH64BIT      Arg4,
    WIDTH64BIT      Arg5,
    WIDTH64BIT      Arg6,
    WIDTH64BIT      Arg7
) {}
```

Thus, in calling the SAL_PROC procedure eight parameters are passed, with Arg0 being the service number of the desired procedure. Data is returned from the SAL_PROC procedure in the rArg structure.

At the assembly language level for microprocessors prior to the Itanium™, calling a BIOS routine involves loading an appropriate BIOS call service number into a designated register, and then issuing a software interrupt. The following is an exemplary assembly language syntax program to invoke interrupt 15 h (15 hexadecimal), service 1:

```
MOV     AH,1    ; Specify service 1
INT     15h     ; invoke BIOS routine category 15h
```

As the comments to the side of the exemplary assembly language code indicate, the first step may comprise moving a service number into the AH register. Although only the number 1 is used for the service number in this example, one of ordinary skill in the art understands that there may be hundreds or thousands of services associated with a BIOS category (interrupt 15 h in the example). After loading the particular service desired in the AH register, the services are invoked which causes the BIOS routines, themselves simply software, to execute on the microprocessor and perform the desired task. To the extent the BIOS routine returns any information, this may be placed in the microprocessor's register or registers as required. The preferred embodiments address determining the proper service number for a desired BIOS routine.

BIOS routines are short programs to perform very specific tasks, generally associated with the movement of data into or out of the computer system. As discussed in the Background section, performing tasks with BIOS routines abstracts platform independent software routines from the specific hardware implementations. The chipset and/or BIOS manufacturer may specify and provide many BIOS routines, and thus their service numbers are constant across the industry. However, chipset manufacturers and/or BIOS development companies also allow original equipment manufacturers (OEMS) to specify and provide their own BIOS routines for OEM specific value added tasks.

In the preferred embodiment, each BIOS routine is assigned a unique identification number, different than the routine's interrupt category and services number, which calling programs, preferably kernel mode drivers, use to identify the desired BIOS routine. Preferably, the unique Identifier for each BIOS routine is of a sufficient number of bits that, for practical purposes, no duplicate identification numbers should exist, even between different OEMs. Stated otherwise, the identification numbers are preferably globally unique. In the preferred embodiments, the identification numbers are Globally Unique Identifiers (GUIDs) generated using the program GUIDGEN.EXE, provided with Microsoft developers tool kit. The GUIDs generated with the GUIDGEN.EXE program are 128 bit identification numbers which are based on the network address of the executing computer, the date and time of running the GUIDGEN.EXE program, along with a random number from a random number generator.

Thus, each OEM provided BIOS routine is preferably assigned a GUID. However, as exemplified above, BIOS routines are identified by an interrupt category and a service, not the GUID, and thus there should be some mechanism to equate or correlate a GUID to a particular service in an interrupt category. In the preferred embodiments, equating a GUID to a BIOS routine service number is accomplished by way of a look-up table.

Figure 2:
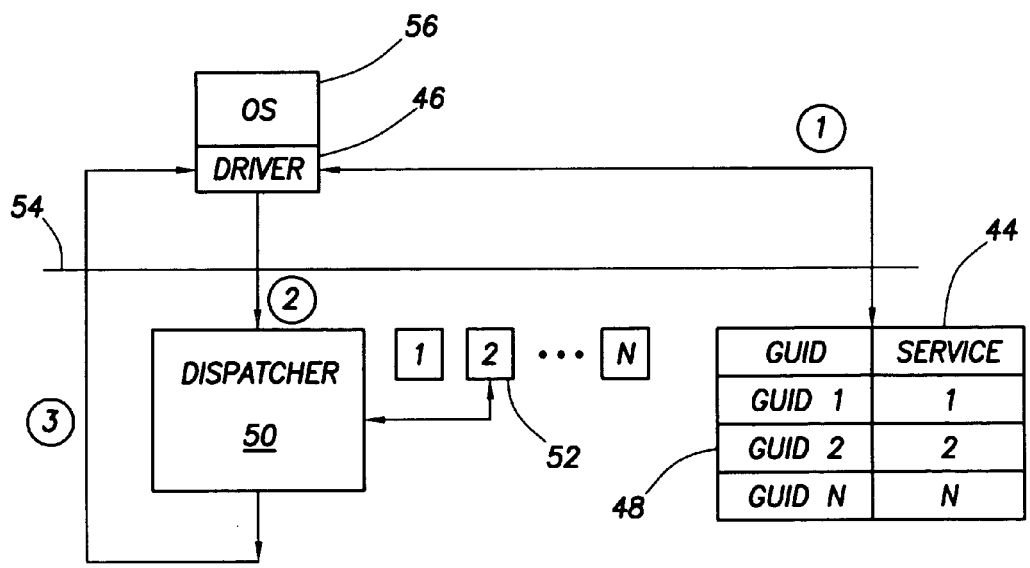
FIG. 2 shows, in graphical form, the relationship between an operating system device driver, BIOS routines in a computer system, and the data table of the preferred embodiments which correlates GUIDs to service numbers.

FIG. 2 shows, in an exemplary graphical form, the relationship between a calling kernel mode software program, the preferred table for association of GUIDs to service numbers, and execution of BIOS routines. The horizontal line 54 graphically represents the separation of the operating system (OS) 56 and driver 46 from the routines and table 44 preferably stored in the BIOS ROM 42. In the preferred embodiments, kernel mode drivers 46 preferably first access the data or look-up table 44 to determine the service number of a desired BIOS routine (this step indicated by a number 1 in FIG. 2). Preferably, the driver searches the table based on the GUID of the BIOS routine desired. For purposes of illustration, consider that the GUID of interest is the GUID held in block 48 of table 44, labeled GUID 2. It must be understood, however, that table 44 does not necessarily contain the actual characters "GUID 2," but preferably contains the 128 bit unique identification program created by the GUIDGEN.EXE program. The GUID 2 location in the table corresponds or correlates to a service number 2. Thus, the driver 46 preferably determines, based on the GUID of the BIOS routine desired, the service number. Once the driver 46 determines the proper service number for the desired BIOS routine, the driver executes the software interrupt in some fashion, for example by calling the desired procedure with the SAL_PROC procedure, passing the proper service number in Arg0.

A portion of the BIOS code known as a dispatcher 50 preferably analyzes the service number passed in the $SAL_{13}$ PROC parameters (or if implemented in an pre-Itanium™ system, the service number stored in the AH register after Issuance of the interrupt) and executes the BIOS routine identified by the service number. In the exemplary case of service number 2, the software that performs the desired functions, exemplified by box 52, is called by the dispatcher.

After execution of the desired BIOS routine, the dispatcher returns, with or without a return parameter based on the specific type of BIOS routine called.

Although there may be many ways for a driver program to ascertain the precise location of the table which correlates the GUIDs to the service numbers, in the preferred embodiments the driver programs access the industry standard System Management BIOS (SMBIOS) table to ascertain the location of the data table. Preferably, the SMBIQS table has an entry which gives a pointer to the location of the data table that correlates the GUIDs to the service numbers. While it is preferred that the driver programs access the SMBIOS table to make a determination as to the location of the GUID to service number correlation table, it is also within the contemplation of this invention that the driver programs may also know the location of the correlation table directly.

Referring again to FIG. 1, the firmware hub 42 is shown to have a table 44 to exemplify that preferably the table used to correlate the GUIDs to service numbers in any particular machine is preferably stored on the firmware hub. As one of ordinary skill in the art is aware, BIOS routines stored on the firmware hub are typically not executed directly from the ROM, but instead are shadowed or copied to and executed from a portion of the main memory. Thus, driver programs accessing the table need not necessarily directly access the ROM, but preferably access that table as it appears in the portion of main memory which reflects the ROM content. Moreover, a driver need not access the data table 44 to ascertain the services number every time, but only need access the data table 44 prior to the first call of the BIOS routine. Thereafter, the correct services number for the BIOS routine is known (if it was saved from a previous access).

Identifying BIOS routine service numbers in this way thus alleviates the requirement for each OEM to have one person responsible for assigning service numbers for the OEM value added BIOS routines. Further, programmers of kernel mode programs that require access to BIOS routines need not perform the prior art technique of simply calling the routine while being unsure that the particular routine is even implemented, or having the hard-coded decision tables which rely on the ROM code and ROM dates as a tangential indication of whether the particular ROM supports the BIOS routine desired. Rather, the driver programmer need only know the GUID of the particular BIOS routine desired, and ascertaining whether that BIOS routine is supported, and if so its service number, is a look-up operation in the table 44.

The above discussion is meant to be illustrative of the principles and various embodiments of the present invention. Numerous variations and modifications will become apparent to those skilled in the art once the above disclosure is fully appreciated. For example, the preferred embodiments describe the use of the GUIDGEN.EXE program to generate a number to uniquely identify each new BIOS routine. However, one of ordinary skill in the art, now understanding the concept of assigning a unique identifier to each BIOS routine, could design equivalent systems for generating unique identifiers, including systems that do not rely on the GUIDGEN.EXE program. Further, the preferred embodiments describe that the table that correlates the GUIDs to the service numbers resides on the BIOS ROM 42. However, this table need not necessarily be stored in the BIOS ROM, and any non-volatile storage location within the computer, for example in non-volatile RAM, may be equivalently used to store the table. Further, table 44 is described to correlate GUIDs to services numbers used as the Arg0 parameter when calling SAL_PROC in the preferred embodiments; however, in cases where the calling procedure is through traditional methods, the table 44 may also include the BIOS category in addition to the services number. Although in the preferred embodiments kernel mode programs such as drivers access the table that correlates the GUIDs to the service numbers, any software program that needs to execute a BIOS routine may utilize the table for determining service numbers prior to execution of the desired BIOS routine. Although it is envisioned that service numbers associated with particular BIOS routine GUIDs will be the same across multiple computers, this need not necessarily be the case. Because each driver program preferably determines a service number based on a GUID prior to calling the BIOS routine, the services numbers could vary from computer to computer. Finally, the preferred embodiments are described in a context of an Intel Itanium™ processor and chipset system; however, the structures and methods described herein are applicable in any computer system having any number of variety of microprocessor and related chipsets. It is intended that the following claims be interpreted to embrace all such variations and modifications.

What is claimed is:

1. A method comprising:
   identifying with a unique identification number a first basic input/output system (BIOS) routine of a plurality of BIOS routines;
   correlating the unique identification number to at least a services number in a data table stored within a ROM; and
   determining, by a BIOS calling program, a services number of the first BIOS routine based on the unique identification number from the data table.

2. The method as defined in claim 1 wherein determining a services number of the first BIOS routine based on the unique identification number from the data table further comprises accessing the data table by the first BIOS calling program based on the unique identification number to determine a services number associated with the unique identification number.

3. The method as defined in claim 1 wherein identifying the first BIOS routine with a unique identification number further comprises identifying the BIOS routine with a Globally Unique Identifier (GUID) 128 bits in length.

4. The method as defined in claim 3 wherein determining a services number of the first BIOS routine based on the unique identification number from the data table further comprises accessing the data table by the BIOS calling program based on the GUID number to determine a services number associated with the GUID.

5. A computer system comprising:
   a central processing unit (CPU);
   a main memory array coupled to the CPU;
   a basic input/output system (BIOS) read only memory (ROM) coupled to the CPU, the BIOS ROM comprising a plurality of BIOS routines; and
   a data table stored within the BIOS ROM, and wherein the data table correlates a unique identification number for a single BIOS routine to a BIOS call services number for the single BIOS routine.

6. The computer system as defined in claim 5 wherein the unique identification number of the BIOS routine further comprise a Globally Unique Identification (GUID) number approximately 128 digits in length.

7. The computer system as defined in claim 5 further comprising:
   a driver program executed by the CPU, the driver program adapted to execute BIOS routines; and
   wherein the driver program accesses the data table to determine a BIOS call service number or the single BIOS routine based on the unique identification number.

8. The computer system as defined in claim 7 wherein the unique identification number of the BIOS routine further comprises a Globally Unique Identification (GUID) number approximately 128 digits in length.

9. A method comprising:
   identifying a first basic input/output (BIOS) routine with a first globally unique identification number, wherein the first globally unique identification number is generated, at least in part, from one or more of a random number or a network address of a computer system generating the globally unique identification number;
   maintaining within the computer system a data table that lists globally unique identification numbers for available BIOS routines; and
   determining the availability of the first BIOS routine by searching the data table based on the fist globally unique identification number, presence of the first globally unique identification number indicating availability of the first BIOS routine in the computer system.

10. The method as defined in claim 9 wherein identifying the first BIOS routine with the first globally unique identification number further comprises identifying the first BIOS routine with the first globally unique identification number being about 128 digits in length.

11. The method as cefined in claim 9 wherein maintaining within the computer system a data table that lists globally unique identification numbers for available BIOS routines further comprises maintaining the data table on a non-volatile device.

12. The method as defined in claim 11 wherein maintaining the data table on a non-volatile device further comprises maintaining the data table on a BIOS read only memory (ROM).

13. The method as defined in claim 9 further comprising determining a BIOS call services number of the BIOS routine based on the globally unique identification number.

14. The method as defined in claim 13 wherein determining a BIOS call services number of the first BIOS routine based on the globally unique identification number further comprises:
   correlating the globally unique identification number of the first BIOS routine to the BIOS call services number of the first BIOS routine in the data table; and
   searching the data table based on the globally unique identification number of the first BIOS routine to determine the BIOS call service number of the first BIOS routine.

15. The method as defined in claim 14 wherein identifying the first BIOS routine with a globally unique identification number further comprises identifying the first BIOS routine with the globally unique identification number being about 128 digits in length.

16. The method as defined in claim 15 wherein maintaining within the computer system a data table that lists globally unique identification numbers for available BIOS routines further comprises maintaining the data table on a non-volatile device.

17. The method as defined in claim 16 wherein maintaining the data table on a non-volatile device further comprises maintaining the data table on a BIOS read only memory (ROM).

18. A basic input/output system (BIOS) read only memory (ROM) for a computer system comprising:
   a set of BIOS routines stored on the BIOS ROM, each BIOS routine invoked by a service number; and
   a correlation table stored on the BIOS ROM, the correlation table correlates a Globally Unique Identifier (GUID) to a service number for at least one BIOS routine.

19. The BIOS ROM as defined in claim 18 wherein the GUID is a number generated based in part on a substantially globally unique random number.

20. The BIOS ROM as defined in claim 19 wherein the GUID is about 128 digits in length.

21. A method comprising:
   identifying a plurality of basic input/output system (BIOS) routines each with individual, unique identification numbers, the unique identification numbers generated, at least in part, from different random numbers;
   correlating the unique identification numbers to BIOS routine service numbers in a data table stored within a ROM; and
   determining, by a driver program, from the data table a service number of a first BIOS routine based on a first unique identification number for the first BIOS routine.

22. The method of calling BIOS routines as defined in claim 21 wherein correlating the unique identification numbers to BIOS routine service numbers in a data table further comprises supplying the data table listing the unique identification numbers, and for each identification number listing a BIOS routine service number.

23. The method of calling BIOS routines as defined in claim 21 wherein determining, by a driver program, from the data table a service number of a first BIOS routine based on the first unique identification number further comprises accessing the data table based on the first unique identification number to determine a service number associated with the first unique identification number.

24. The method of calling BIOS routines as defined in claim 21 wherein identifying a plurality of BIOS routines with unique identification numbers further comprises identifying the plurality of BIOS routines each with a Globally Unique Identifier (GUID) about 128 digits in length.

25. The method of calling BIOS routines as defined in claim 24 wherein correlating the unique identification numbers to BIOS routine service numbers in a data table further comprises supplying the data table listing the GUID and service number for the plurality of BIOS routines.

26. The method of calling BIOS routines as defined in claim 25 wherein determining, by a driver program, from the data table a service number of a first BIOS routine based on the unique identification number further comprises accessing the data table based on a GUID of the first BIOS routine to determine a service number associated with the GUID of the first BIOS routine.

27. A computer system comprising:
   a means for executing software programs;
   a means for storing data and programs coupled to the means for executing;
   a means for storing basic input/output system (BIOS) routines coupled to the means for execuling; and
   a means for storing unique identification numbers of BIOS routines correlated to BIOS cal service numbers for the BIOS routines, the means for storing unique identification numbers associated with the means for storing BIOS routines.

28. The computer system as defined in claim 27 wherein the unique identification numbers of the BIOS routines further comprise Globally Unique Identification (GUID) numbers about 128 digits in length.

29. The computer system as defined in claim 27 further comprising:

a means for calling BIOS routines, the means for calling executed by the means for executing; and wherein the means for calling further accesses the means for storing unique identification numbers to determine a BIOS call service numbers for BIOS routines based on the unique identification numbers.

30. The computer system as defined in claim 29 wherein the unique identification numbers of the BIOS routines further comprises Globally Unique Identification (GUID) numbers about 128 digits in length.

* * * * *

UNITED STATES PATENT AND TRADEMARK OFFICE
CERTIFICATE OF CORRECTION

PATENT NO. : 7,143,276 B2 Page 1 of 1
APPLICATION NO. : 10/034220
DATED : November 28, 2006
INVENTOR(S) : Michael R. Garrett et al.

It is certified that error appears in the above-identified patent and that said Letters Patent is hereby corrected as shown below:

In column 1, line 27, delete "army" and insert -- array --, therefor.

In column 1, line 38-39, delete "(or taken away from the)" and insert -- (or taken away) from the --, therefor.

In column 6, line 11, delete "kemel" and insert -- kernel --, therefor,

In column 6, line 61, delete "$SAL_{13}$" and insert -- SAL_ --, therefor.

In column 7, line 2, delete "retum" and insert -- return --, therefor.

In column 7, line 9, delete "SMBIQS" and insert -- SMBIOS --, therefor.

In column 9, line 6, in Claim 7, delete "or" and insert -- for --, therefor.

In column 9, line 25, in Claim 9, delete "fist" and insert -- first --, therefor.

In column 9, line 34, in Claim 11, delete "cefined" and insert -- defined --, therefor.

In column 10, line 65, in Claim 27, delete "execuling" and insert -- executing --, therefor.

In column 10, line 67, in Claim 27, delete "cal" and insert -- call --, therefor.

Signed and Sealed this

Twentieth Day of January, 2009

JON W. DUDAS
*Director of the United States Patent and Trademark Office*